Sept. 13, 1938.　　O. M. SHATTUCK ET AL　　2,129,882
LAMP FLASHER
Original Filed March 12, 1935　　2 Sheets-Sheet 1
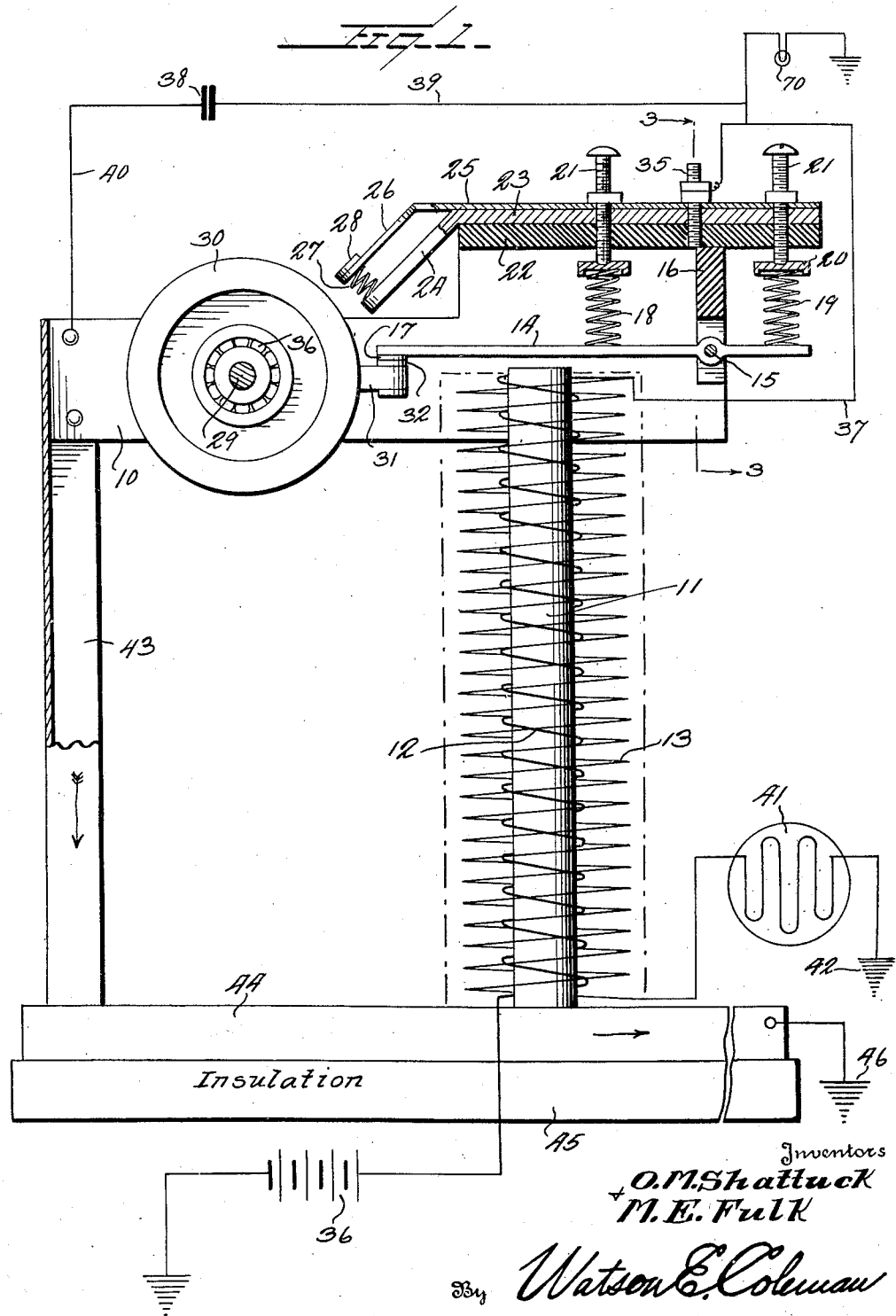

Sept. 13, 1938. O. M. SHATTUCK ET AL 2,129,882
LAMP FLASHER
Original Filed March 12, 1935 2 Sheets-Sheet 2
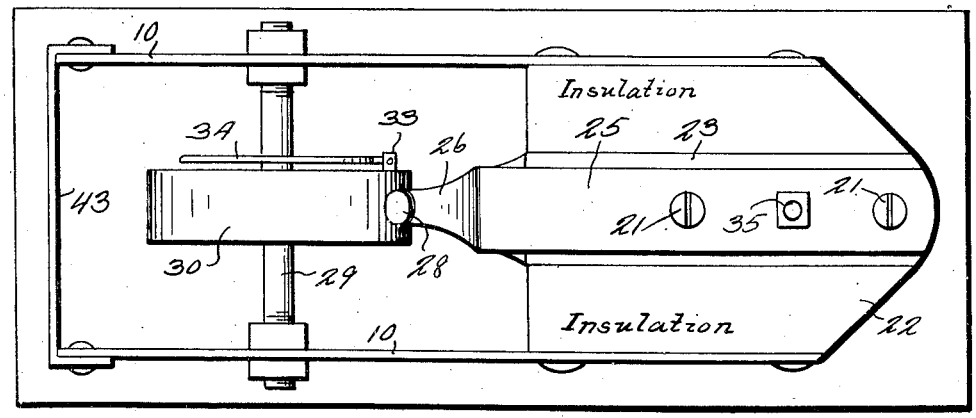
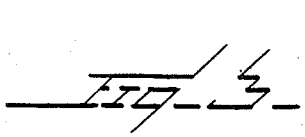
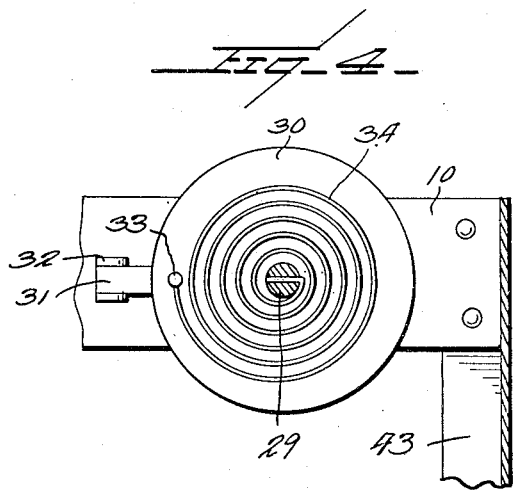

Patented Sept. 13, 1938

2,129,882

UNITED STATES PATENT OFFICE 2,129,882

LAMP FLASHER

Owen M. Shattuck and Murl E. Fulk, Zanesville, Ohio

Application March 12, 1935, Serial No. 10,744
Renewed July 21, 1938

8 Claims. (Cl. 200—90)

This invention relates to devices for flashing lamps and particularly to a flasher designed to be used on heavy transport trucks and to be used with a neon light. Heretofore, heavy trucks and buses which have been used for interstate commerce or for long hauls, have been provided with parti-colored lamps as well as with the usual headlights, tail lights and stop signal lights, for the purpose of warning traffic of the presence of a truck on the road. These, while sufficient during the period when the truck is actually traveling, provide no automatically actuated safeguard when the truck has been stopped, either intentionally or through an accident, because while the lamps may continue to be energized at the time the truck stops, yet they do not show positively that the truck has stopped but give a distinct signal which is a standardized signal and does not indicate to the other drivers that this signal means a stoppage of the truck. Furthermore, the ordinary and usual lamps may go out by reason of a short circuit or by reason of battery exhaustion, thus leaving no other means to warn oncoming traffic than the use of flares or signal lanterns. Many states require that if a long distance truck or bus stops that the operator must go back and place a torch a hundred feet or so rearward and another torch a hundred feet or so forward of the truck. This, because of the nuisance which it involves, is oftentimes neglected by the drivers of these vehicles.

It might be suggested that it would be possible to equip these trucks with ordinary danger-indicating electric lamps and provide means for energizing these lamps when the truck comes to a stop, but the difficulty here is that these trucks consume so much power for the ordinary running lamps that generators frequently burn out and, from a practical standpoint, no signalling system will be used that requires more power to be expended than is required for the ordinary commonly used lamps. It is also required that these heavy haulers shall carry oil lanterns with them which are hung at the rear of the truck so that if the electric lamps go out, the lanterns will still constitute a signal, but this practice is open to the objection that in case of a smash, there is great likelihood of fire, because of the use of these oil lamps.

Another objection to the use of electric lamps as signals is that they do not have any very great light penetration in case of fog, heavy snow or the like atmospheric conditions.

With these problems in mind, it is the object of this invention to provide a signalling means for trucks, buses and other motive vehicles which includes the use of a neon signal lamp, energized automatically upon the stoppage of the vehicle and which is disposed in such a circuit that very little power will be used for its energization, such power being provided by a small storage battery not connected in any way to the generator or source of current used for the ordinary lamps of the vehicle.

It is another object of this invention to provide a signalling mechanism of the character stated which uses a neon lamp and in which an induced current is intermittently sent through this neon lamp by the action of a flasher operated in turn by an induction coil through the primary winding of which the current is intermittently broken, thus securing not only a flashing of the lamp (which flashing provides a signal which will be much more noticeable than if the lamp were steadily illuminated) but also causing the necessary interruption of current in the primary coil which is necessary in order to secure induction in the secondary coil.

Another object is to provide a flasher which is extremely economical in current and in which there is no current utilized to operate the flasher mechanism except that which is used in illuminating the neon tube.

A further object is to provide a flasher which will operate from nine to twelve months on one storage battery charge, the battery capacity being 6 volts, 100 AH.

A further object of the invention is to provide a flasher of this character which is very simple, compact, and will not easily get out of order.

Our invention is illustrated in the accompanying drawings wherein:

Figure 1 is a side elevation partially diagrammatic of a flashing mechanism constructed in accordance with our invention;

Figure 2 is a top plan view of the flasher shown in Figure 1;

Figure 3 is a section on the line 3—3 of Figure 1;

Figure 4 is a side elevation of the oscillating wheel flasher, the fixed shaft upon which the wheel is mounted being shown in section.

Referring to these drawings, 10 designates a supporting frame of any suitable character. Carried upon the frame in any suitable manner is a magnetic core of soft iron designated 11, having thereon the primary coil 12 and the secondary coil 13, the core and the two coils constituting, of course, an induction coil. Mounted upon the frame but insulated therefrom is an armature 14 which is oscillatably mounted upon the pin 15 carried by a depending portion 16 of the frame. This armature at its extremity carries a contact 17. The armature is held in a balanced position by means of springs 18 and 19, which bear against the armature on opposite sides of the pivot 15, these springs at their upper ends being engaged by metallic caps 20 in turn engaged by adjusting screws 21 extending downward through a block 22 of insulation and through a certain contact member, as will be later stated. Mounted upon the insulating block 22, which forms part of the frame is a metallic plate 23 which extends longitudinally over the insulating block 22 and at its forward end is bent downward and forward towards the contact 17, as at 24. Mounted upon this plate 23 is a metallic strip 25, which extends out beyond the angular portion 24 of plate 23, and is then downwardly extended at 26 parallel to the portion 24. This extension 26 is resilient so that it may be forced toward the angular extension 24 and is urged outward by a coil spring 27. The face of the extension 26 carries upon it the contact 28.

Extending through the frame 10 is a fixed shaft 29, carrying upon it a disk or wheel 30, which has projecting from it the radial lug 31. This lug is a conductive lug and carries upon it the contact 32 which is adapted to impinge against the contact 17 carried by the armature 14. The disk or wheel 30 also carries upon it the laterally projecting pin 33, and connected at its outer end to this pin is a coil spring 34, the inner end of which is rigidly connected to the shaft 29, as shown in Figure 4. Extending upward from the block 22 and having conductive engagement with the metallic strips 23 and 25 is a binding screw 35. The wheel or disk 30 is preferably mounted upon ball bearings 30a and is in conductive engagement with the shaft 29 which in turn is in conductive engagement with the frame 10.

The primary coil 12 is connected at one end to a battery 36. The other end of the primary coil is connected by a conductor 37 to the binding screw 35. A condenser 38 is connected across the breaker points by means of conductors 39 and 40, the conductor 39 being connected to the wire 37 and the conductor 40 being connected from the other side of the condenser to the metallic frame 10. The secondary 13 of the induction coil is connected to the wire 37 at one end and at the other end is connected to a neon lamp shown diagrammatically in Figures 1 and 5, and designated generally 41, this neon lamp being connected to the ground 42. The metallic frame 10 is shown as connected by a metallic leg 43 to a metallic bar 44 mounted upon insulation 45, and this metallic bar 44 in turn is connected to a ground 46.

The operation of this flasher mechanism is as follows:

The current passing from battery 36 passes through the primary coil 12 of the induction coil, then through conductor 37 to the terminal 35, through the metallic member 23 to the adjusting screws 21, through the springs 18 and 19 to the armature 14. From armature 14, the current passes to the contact 32, thence to the lug 31, the wheel 30, the spring 34 to shaft 29, and from the shaft 29 to the frame 10, then by way of the metallic support 43 to the metallic member 44, thence to the ground 46, and back to the battery 36. Immediately that the current passes through the primary coil 12, it energizes the core 11, pulling down the armature 14 which gives a kick to the wheel 30, rotating the wheel 30 in a clockwise direction, the impetus being such as to give the wheel nearly a full rotation. As the wheel starts to move away from the armature 14, the circuit through the primary coil is broken at the contacts 17 and 32, which causes an induced current of high voltage in the secondary coil 13 of the induction coil, which current of high voltage passes from the secondary coil to the lamp and so through the ground 42 and back to the battery 36, causing the neon lamp to flash. Wheel 30 continues its rotation until the contact on lug 31 engages the contact 28 on the conducting bar 25, which again closes the circuit through the primary coil 12. The impact of the lug 31 against the contact 28 compresses the spring 27 and the rebound of this spring causes the wheel 30 to move in the opposite direction, thus breaking the circuit through the contacts 32 and 28 and again inducing a current in the secondary coil 13, causing the neon lamps to again flash. The spring 34 causes the wheel 30 to move in a counter-clockwise direction until the lug 31 strikes the armature 14, then the circuit through the primary coil is again closed, the armature is again pulled down, giving a reverse kick to the wheel and the current is again broken, causing a discharge through the neon lamp.

The adjustment of the springs 18 and 19 is necessary because the amount of pull exerted by core 11 on the armature would be too great and would cause too great a speed of oscillation to be given to the wheel 30. By increasing the tension of spring 19 and reducing the tension of spring 18, the strength of the blow struck by the armature is reduced and, therefore, by adjusting the springs 18 and 19, just the right degree of impact of the armature is secured and just the proper speed for the wheel can be secured. It will be thus seen that by adjusting the tension of the springs 18 and 19, the speed of the wheel 30 may be adjusted and thus the speed of the flashes may be controlled.

It is one of the particular advantages of this invention that the flashing mechanism which we have disclosed is particularly economical in that there is no current utilized to operate the flasher mechanism except that which is used in lighting the neon tube. In actual practice, it has been found that this flasher will operate from nine to twelve months on one storage battery charge, the battery having a capacity of 6 volts, 100 AH.

The flasher mechanism is operated by the otherwise wasted magnetic energy produced by the operation of the induction coil in the induction of EMF necessary to light the neon lamp. There is no power consumed by the operation of wheel 30 and armature 14 except that which would have been consumed by the neon light itself had the current been interrupted by some other mechanical means than that illustrated. In other words, when current is intermittently made and broken through the primary coil as, for instance, by some extraneous breaking means, magnetic flux is set up in the core 11. Under these circumstances, that portion of the flux which is not employed in inducing the current in the secondary coil is wasted, but with our mechanism, this otherwise wasted magnetic force is utilized to operate the flashing mechanism itself.

While we have illustrated certain details of construction and certain arrangement of parts, it is, of course, to be understood that many changes might be made therein without departing from the spirit of the invention as defined in the appended claims.

What is claimed is:—

1. A flasher mechanism of the character described, including a coil and a core constituting together an electromagnet; an armature for said core; a rotatable element mounted for free oscillation and having an outwardly projecting lug adapted to engage the armature at one point in the arc of oscillation of the rotatable element; resilient means constantly engaging with and urging the rotatable element in a direction to carry its lug into engagement with the armature and move the armature away from the core; the contact of the lug with the armature closing a circuit through the coil and core to thus cause the armature to be attracted to the core and give an impulse to the rotatable element against the action of the resilient means; and means disposed in the path of movement of the lug for again closing a circuit through the coil when the rotatable element has carried its lug away from the armature.

2. A flasher mechanism of the character described, including a coil and a core constituting together an electromagnet; an armature for said core; means urging the armature away from the coil and core; a rotatable element mounted for free oscillation and having an outwardly projecting lug free from but adapted to engage the armature at one point in the arc of oscillation of the element; resilient means constantly engaging with and urging the rotatable element in a direction to carry its lug into engagement with the armature and move the armature away from the core; means for closing a circuit through the rotatable element, and the coil upon the contact of the lug with the armature to thus cause the armature to be attracted to the core and give an impulse to the rotatable element against the action of the resilient means; and means disposed in the path of movement of the lug for again closing a circuit through the coil when the rotatable element has carried its lug away from the armature.

3. A flasher mechanism of the character described, including a coil and a core constituting together an electromagnet; an armature for said core; yielding means supporting the armature in spaced relation to the adjacent end of the core and yieldingly resisting movement of the armature in either direction; a rotatable element mounted for free oscillation and having an outwardly projecting lug adapted to engage the armature; resilient means urging the rotatable element in a direction to carry its lug into engagement with the armature and move the armature in a direction away from the core; means completing a circuit through the rotatable element, the lug, the armature and the coil upon the contact of the lug with the armature to thus cause the armature to be attracted to the core and give an impulse to the rotatable element against the action of the resilient means; and means disposed in the path of movement of the lug for again closing a circuit through the coil when the rotatable element has carried its lug away from the armature.

4. A flasher mechanism of the character described, including a coil and a core constituting together an electromagnet; an armature for said core; yielding means supporting the armature in spaced relation to the adjacent end of the core and yieldingly resisting movement of the armature in either direction; a rotatable element mounted for free oscillation and having an outwardly projecting lug adapted to engage the armature; resilient means urging the rotatable element in a direction to carry its lug into engagement with the armature and move the armature in a direction away from the core; means completing a circuit through the rotatable element, the lug, the armature and the coil upon the contact of the lug with the armature to thus cause the armature to be attracted to the core and give an impulse to the rotatable element against the action of the resilient means; and means disposed in the path of movement of the lug for again closing a circuit through the coil when the rotatable element has carried its lug away from the armature, including a resiliently supported contact with which the lug is adapted to engage.

5. A flasher mechanism of the character described, including a coil and a core constituting together an electromagnet; an armature for said core pivoted intermediate its ends; springs engaging the armature on each side of its pivot and acting to yieldingly support the armature away from the core and yieldingly resist movement of the armature in either direction; a rotatable element mounted for free oscillation and having an outwardly projecting lug adapted to engage the armature; resilient means urging the rotatable element in a direction to carry its lug into engagement with the armature and move the armature away from the core; a circuit including a source of potential, the coil, the armature and the rotatable element; said circuit being closed upon engagement of the lug with the armature; the closing of the circuit causing the core to attract the armature and give an impulse to the rotatable element against the action of the resilient means; and means disposed in the path of movement of the lug and electrically connected to the coil whereby a circuit through the coil is again closed when the rotatable element has carried its lug away from the armature and into engagement with the said means.

6. A flasher mechanism of the character described, including a coil and a core constituting together an electromagnet; an armature for said core pivoted intermediate its ends; springs engaging the armature on each side of its pivot and acting to yieldingly support the armature away from the core and yieldingly resist movement of the armature in either direction; a rotatable element mounted for free oscillation and having an outwardly projecting lug adapted to engage the armature; resilient means urging the rotatable element in a direction to carry its lug into engagement with the armature and move the armature away from the core; a circuit including a source of potential, the coil, the armature and the rotatable element; said circuit being closed upon engagement of the lug with the armature, the closing of the circuit causing the core to attract the armature and give an impulse to the rotatable element against the action of the resilient means; a contact resiliently supported in the path of movement of the lug on the rotatable element, said contact being electrically connected to the coil whereby when the lug engages the contact a circuit will be again closed through the coil and the source of potential.

7. A flasher mechanism of the character decribed, including a coil and a core constituting together an electromagnet; an armature for said core pivoted intermediate its ends; springs engaging the armature on each side of its pivot and acting to support the armature in a normal spaced relation from the core; means for separately adjusting said springs; a rotatable element mounted for free oscillation and having an outwardly projecting lug adapted in one position of the element to engage the armature; the rotatable element and lug being electrically conductive and the element being connected in a circuit with a source of potential, the coil and the armature whereby upon contact of the lug with the armature a circuit will be closed through the coil to cause the attraction of the armature and cause the armature to give an impulse to the wheel to carry its lug out of engagement with the armature and break the circuit through the coil, and resilient means resisting the movement of the wheel under the impulse given to it by the armature and causing a return of said wheel to the position with its lug in engagement with the armature.

8. A flasher mechanism of the character described, including a coil and a core constituting together an electromagnet; an armature for said core; springs yieldingly supporting the armature in spaced relation to the core and yieldingly resisting movement of the armature from this position; a wheel mounted for free rotation and having an outwardly projecting lug adapted to engage the armature, the lug and the wheel being conductive and being connected in circuit with a source of potential, the armature and the coil; a spring within the wheel acting to urge the wheel in a direction to carry its lug into engagement with the armature and move the armature away from the core against the action of one of the first named springs, and a resiliently supported contact disposed in the path of movement of the lug on the wheel and electrically connected to the coil whereby the circuit through the coil is again closed when the lug comes into engagement with the contact.

OWEN M. SHATTUCK.
MURL E. FULK.